Figure 2:
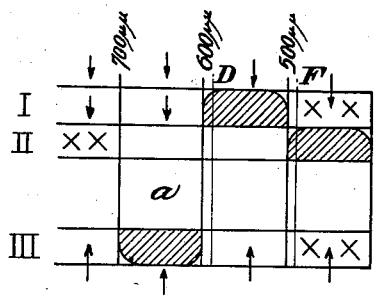

Fig. 1.

| Color and Sequence of the layers | Sensitivity | Color of printing light | Sensitivity | Color of printing light | Sensitivity | Color of printing light | Sensitivity | Color of printing light |
|---|---|---|---|---|---|---|---|---|
| 1. yellow / magenta (support) / bluegreen | green / red / green | green / red / green | red / infrared / blue | white minus infrared / infrared / (white minus infrared) | | | | |
| 2. magenta / yellow (support) / bluegreen | blue / red / green | blue / red / green | red / infrared / blue | white minus infrared / infrared / (white minus infrared) | | | | |
| 3. bluegreen / yellow (support) / magenta | blue / green / blue | blue / green / blue | green / infrared / red | white minus infrared / infrared / (white minus infrared) | | | | |
| 4. yellow / bluegreen (support) / magenta | green / infrared / blue | white minus infrared / infrared / blue | red / green / red | red / green / red | green plus red / infrared / bluegreen | bluegreen / infrared / (white minus infrared) | white minus infrared / green plus red / (white minus infrared) | |
| 5. magenta / bluegreen (support) / yellow | blue / infrared / green | blue / infrared / green | red / infrared / red | red / infrared / red | blue / infrared / bluegreen | blue / infrared / bluegreen | red / infrared / red | white minus infrared / infrared / (white minus infrared) |
| 6. bluegreen / magenta (support) / yellow | blue / infrared / green | blue / infrared / green | red / red / red | green / red / red | blue plus green / green / blue plus green | green / infrared / green | green plus red / red / green plus red | white minus infrared / infrared / (white minus infrared) |

Inventor

BELA GASPAR

By F. Gerald Toye

Attorney

Inventor
BELA GASPAR

Patented Dec. 12, 1939

2,183,393

UNITED STATES PATENT OFFICE 2,183,393

PROCESS AND MATERIAL FOR PRODUCING THREE COLOR PHOTOGRAPHS AND CINEMATOGRAPHIC PICTURES ON A TRANSPARENT FILM

Béla Gaspar, Brussels, Belgium

Application November 16, 1932, Serial No. 642,960
In Germany November 17, 1931

26 Claims. (Cl. 95—2)

In my Patent 1,985,344 of December 25th, 1934, I have described a process for the production of photographs in two or more colors. In that process a number of silver halide emulsion layers that are diffusely colored and sensitised in the layer are formed on each other and the individual layers are sensitised for particular rays which are transmitted by the overlying layers and by the dyestuff that colors the layer, and then the dyestuff is destroyed at the position of the silver deposit or at the position that is free from deposit.

It has now been found that in the production of diapositives, particularly of cinematographic pictures, certain advantages are obtained over the process described in the aforesaid patent, if, for the purpose of producing three-color pictures, two colored layers instead of three colored layers are formed upon each other on one side of the film and the third colored layer is formed on the other side of the film. In the case of cinematographic films and diapositives, these advantages lie in the fact that the so-called "non-curling layer" is omitted and its function taken over by the light-sensitive layer; moreover, the subsequent correction of the colors is very simple and the light-sensitive layers can be developed in a shorter time. In addition, the copying is simpler owing to the fact that, according to the invention, it is not necessary with most of the layers to work with a colored light of a strictly definite color or spectral region.

It is already known to form two colored layers on one side of a layer-carrier and a colored layer on the other side, but the individual layers in these arrangements are sensitised for light rays which are complementary to the specific color of the layer. In the case of these arrangements, it is known to be impossible to obtain well exposed pictures unless extremely long times of exposure are employed. However, in the case of most of the intensive colorations that are necessary for diapositives, even these long exposure periods are useless.

The advantages of the process according to the present invention will be clear from the following example which, at the same time, represents a typical embodiment of the present process.

One side of the film is coated with a yellow-colored and a magenta colored emulsion in such a manner that the layer of magenta colored emulsion lies on the top; the other side of the layer-carrier is coated with a bluish-green emulsion. As is known, the principal color in a three-color picture is the bluish-green partial picture, but the nature of the magenta partial picture is also very important. The yellow partial picture of the three-color picture, on the other hand, is in the background; in its case, neither the sharpness nor the correct modulation plays such an important part in the nature of the total colored picture. Therefore, it is important in the first place, to be able to copy sharply the two principal colors in the three-color picture and secondly to be able to influence subsequently the intensity by chemical after-treatment, reduction, etc. For this purpose it is very advantageous if the colors of the important partial colors lie on the outside, as described in the case of the above arrangement. On the other hand, it is often also advantageous, for the purpose of avoiding parallax, to have the two principal colors in one layer and to arrange the yellow color in the other layer.

In using the above material for copying pictures, one may proceed as described in Patent 1,985,344 of December 25, 1934, by copying from only one side of the multi-layer material. As copy matter, either black-and-white partial negatives or any desired colored copy matter may be employed. In this case the sensitising of the silver halide layers will take place in the manner stated in the parent patent. For example, the magenta layer is sensitive to blue, the yellow layer to orange-red and the bluish-green layer to infra-red. A further advantage of the arrangement according to this invention, of the three layers on both sides of the layer-carrier is that if the sensitising and coloring are effected in such a manner that the middle layer, which contains the third color, at the same time acts as an isolating layer, one is in a position to copy the partial negatives from both sides of the film.

Since the two outer layers are colored in colors, such as magenta and blue-green, which have an absorption gap in the blue region of the spectrum, a special sensitising of these layers is unnecessary. The yellow layer is sensitised for infra-red rays with crypto-cyanine for example. The copying is now very simple; the corresponding partial pictures are copied on the two outer layers with white light from which the infra-red rays have been filtered out by a suitable filter which contains, for example, naphthol green or filter bluish-green, or a container filled with a copper sulphate or nickel salt solution.

The yellow partial negative or partial positive is copied with infra-red rays.

The yellow layer can also be made sensitive only to red; in this case the two outer partial pictures are copied with a blue filter.

Alternately, the foremost magenta layer can also be sensitised for red; in such a case this layer will be sensitive to the red fraction of the white light as well as to the blue. This possibility, that, in contra-distinction to the process of the parent patent, one is not so strictly bound in the sensitising or one has a greater amount of freedom in increasing the sensitivity, is especially important in a case of the copying of the positive film where it is possible to work with a shorter exposure and consequently more rapidly.

Consequently, the essence of the invention lies in the fact that, by suitable sensitisation, the layer is rendered suitable for the copying process—i. e., according to the invention the possibility is provided of copying from one side, optically or in contact, from any desired copy matter or, as is very advantageous for the sharpness of the picture, of copying from both sides either optically or in contact. In the latter case, the coloration of the middle layer will either, as described in the above example, be so chosen that this layer isolates the two outer layers from each other or acts as a protecting layer by absorbing the copying rays that enter it from the front and back (e. g., yellow prevents the blue rays from passing from one side to the other). Moreover, the sensitising of the layers may be so chosen that, for the part of the radiation which passes through from one side to the other, the opposite layer is insensitive to the rays that pass through.

For carrying out the process the arrangements given in the tables set forth in Figure 1 of the drawings may be employed.

There is also the possibility of exposing the one double layer by means of selectively absorbing composite two-color copy matters (which are colored in colors that are complementary to the sensitivity of the individual partial layers) in the manner described in the parent patent aforesaid for a one-sided light-sensitive material consisting of a plurality of consecutively formed partial layers.

In addition, in order to avoid the adjustment of the color and intensity of the sources of light each time, one may proceed, according to my invention, by diffusely coloring the gelatine of the black-and-white negative or diapositive (according to whether a process for the production of pictures is employed which leads to positive pictures or reverse pictures). In this manner the various corrections of the time of exposure for a definite copy material or a different color effect of the copy can be obtained. For example, black-and-white partial pictures (copy matter) of the magenta and blue-green partial pictures are colored so as to absorb infra-red by bathing them for a short time in a solution of naphthol green or filter bluish-green, and the black-and-white copy matter of the yellow partial picture is colored almost black with patent blue and tartrazine.

The subsequent correction of the individual partial color pictures is greatly facilitated as a result of the arrangement of the layers in accordance with the invention, by treating only one side of the film with a liquid. This can easily be carried out with known devices. The correction of the colors consists in either reducing a too prominent color by suitable means—for example with a dilute acid solution of potassium permanganate—or causing suitable substances, which act as color-intensifiers, to act on the dye picture. It is, however, also possible to correct the whole colored picture by diffuse coloration.

In the middle layer, which acts as an isolating layer, as a rule only the dyestuff that is used for building up the picture is employed as a protecting or isolating filter dyestuff. However, any desired additional filter dyestuffs may be incorporated in the middle layer or in the outer layers in the manner already described in the parent patent aforesaid, and this additional filter dyestuff can afterwards be washed out or destroyed so as not to take part in the picture production itself.

The building up and mode of operation of the layers are diagrammatically illustrated in the drawings, of which Figure 2 shows photographic material which is coated on both sides and in which the layer-carrier is coated on one side with one and on the other side with two differently colored and sensitised light-sensitive layers.

Layers II and III are carried by the support and layer I is superposed on layer II. On the whole cross-section of the material there is projected a spectrum which, in the drawings, begins on the left at the infra-red end and extends through the whole visible spectrum.

The vertical lines, which extend through all the layers, designate light rays of the indicated wave lengths 700, 600 and 500μμ. Lines D and F denote the D and F lines of the spectrum. The D line, as is known, is considered as approximately the boundary line between the red and green regions of the spectrum. The F line is likewise considered as approximately the boundary line between the green and blue regions of the spectrum.

The obliquely hatched surfaces denote the absorption curves of the dyestuff that colors the layer. It will be understood that the absorption of an overlying layer is effective to shade an underlying layer against light rays absorbed by said overlying layer in all of the Figures 2, 3, 4, 5, 6 and 7. The mark X denotes a portion of the spectrum for which the layer concerned is sensitized. In Figures 2 and 5 each layer is shown to be sensitized for only one of the blue, green, red, and infra-red spectral regions. However a layer can be sensitized for more than one of the spectral regions and Figures 3, 4, 6 and 7 include a reference to examples in which each layer is sensitized alternatively to different spectral regions or may be sensitized simultaneously to more than one spectral region. In these Figures 3, 4, 6 and 7 the mark X which indicates the portion of the spectrum for which the layer in question is sensitized is crossed through either horizontally (X) or vertically (X). This denotes two different alternatives of sensitization and also shows that one layer might be sensitized for light rays of more than one spectral region.

The position of the support in all of the Figures 2 to 7, inclusive, is designated by "a".

*Figure 2.*—In layer I, the absorption curve (obliquely hatched) denotes a magenta dyestuff; this dyestuff absorbs between 500 and 600mμ. The absorption curve in layer II denotes a yellow dyestuff absorbing up to 500mμ and the absorption curve in layer III denotes a blue dyestuff absorbing between 600 and 700mμ.

Layer I is sensitized for blue.
Layer II is sensitized for infra-red.
Layer III is sensitized for blue.

One of the layers I and II may also be sensitized additionally for red light or may be sensitive to red light alone. Layer III might be sensitized additionally for green light or may be sensitive to green light alone.

Figure 3:
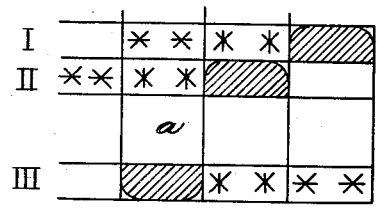

In Figure 3 layer I contains a yellow dyestuff, layer II a magenta dyestuff and layer III a blue-green dyestuff.

Layer I is sensitized for red or for green.
Layer II is sensitized for infra-red or for red.
Layer III is sensitized for blue or for green or for both rays.

Figure 4:
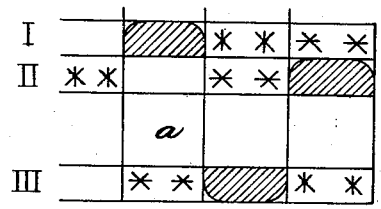
Figure 5:
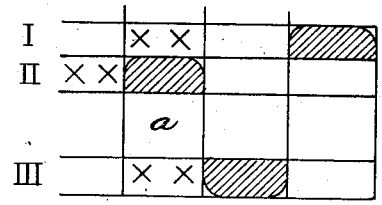

In Figure 4 layer I contains a blue-green dyestuff, layer II a yellow dyestuff and layer III a magenta dyestuff.

Layer I is sensitized for blue or for green or for both rays.
Layer II is sensitized for green or for infra-red or for both rays.
Layer III is sensitized for red or for blue or for both rays.

In Figure 5 layer I contains a yellow dyestuff, layer II a bluish-green dyestuff and layer III a magenta dyestuff.

Layer I is sensitised for red.
Layer II is sensitized for infra-red.
Layer III is sensitized for red rays.

Figure 6:
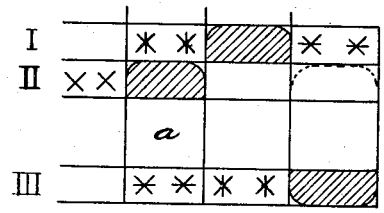

In Figure 6 layer I contains a magenta dyestuff, layer II a bluish-green dyestuff and layer III a yellow dyestuff.

Layer I is sensitised for red or for blue or for both rays.
Layer II is sensitised for infra-red.
Layer III is sensitised for green or for red or for both rays.

Figure 7:
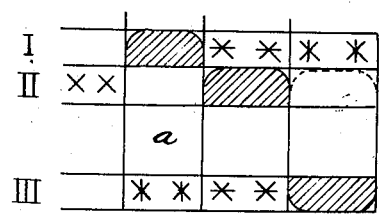

In Figure 7 layer I contains a blue-green dyestuff, layer II a magenta dyestuff and layer III a yellow dyestuff.

Layer I is sensitised for green or for blue or for both rays.
Layer II is sensitised for infra-red.
Layer III is sensitised for green or for red or for both rays.

In Figures 6 and 7, dotted absorption curves are drawn in the spectral region between 400 and 500 mµ. These absorption curves denote an additional filter dyestuff which is capable of being readily washed out or destroyed and which does not serve for building up the picture but for avoiding exposure of the layer underlying the surface layer. It will be understood that the colors, sensitizations and the order of the layers set forth in the foregoing have been set out solely by way of example, and that numerous modifications are possible within the meaning of the description and the annexed claims without departing from the spirit of the invention. It is to be understood that where the term "middle layer" is used in this specification and in the annexed claims, it is intended to broadly designate a layer which is positioned between the two outer layers but not necessarily midway therebetween, and which is not necessarily the only layer or element therebetween.

What I claim and desire to secure by Letters Patent of the United States is:

1. A light-sensitive material for producing multi-color photographs, cinematograph images and the like, comprising a support having two diffusely colored light-sensitive silver halide layers on one side and a single diffusely colored light-sensitive silver halide layer on the opposite side, the outer layer on the double-coated side of the support being colored magenta and predominantly sensitive for blue, and the middle layer on the double coated side of said support being yellow and sensitized predominantly for red, the said layer on the single coated side of the support being bluish-green and predominantly sensitive for blue.

2. A light sensitive material for producing multi-color images comprising a support having two diffusely colored light-sensitive silver halide layers on one side and a single diffusely colored light-sensitive silver halide layer on the other side, the two outer layers being of the same predominant sensitivity, the middle layer being predominantly sensitive for another part of the spectrum, the outer layers being differently colored by dyestuffs which allow transmission of the light rays for which the layers are sensitized, and at least one of the said dyestuffs allowing transmission of the light rays for which the middle layer is sensitized, the middle layer being colored by a dyestuff which transmits the light rays for which the layer itself is sensitized, but absorbs the light rays for which the outer layers are sensitized.

3. A light-sensitive material for producing multi-color photographs, cinematographic images and the like, comprising a support having two diffusely colored light-sensitive silver halide layers on one side and a single diffusely colored light-sensitive silver halide layer on the opposite side, the outer layer on the double coated side of the support being colored blue-green and predominantly sensitive for blue, and the inner layer on the double coated side of said support being yellow and predominantly sensitized for green, the said layer on the single coated side of the support being magneta and predominantly sensitive for blue.

4. A slight-sensitive material for producing multi-color images, comprising a support having two diffusely colored light-sensitive silver halide layers on one side and a single diffusely colored light-sensitive silver halide layer on the other side, the two outer layers being silver halide layers predominantly sensitive for blue, the middle layer being predominantly sensitized for another part of the spectrum, the outer layers being differently colored by dyestuffs which allow transmission of blue light, and at least one of the said dyestuffs allowing transmission of the light rays for which the middle layer is sensitized, the middle layer being colored yellow.

5. A light-sensitive material for producing multi-color images, comprising a transparent support and three diffusely colored light-sensitive silver halide layers in superposition thus forming two outer layers and a middle layer between them, the two outer layers being silver halide layers sensitive for blue, the middle layer being sensitive for infra red, the outer layers being differently colored by dyestuffs which allow transmission of blue light, and at least one of the said dyestuffs allowing transmission of the infra red light rays, the middle layer being colored yellow.

6. A process for printing onto a light sensitive material comprising a transparent support and three diffusely colored light sensitive silver halide layers in superposition, thus forming two outer layers and a middle layer between them, the two outer layers being sensitive to a common spectral range, the middle layer being sensitive for another part of the spectrum, the outer layers being differently colored by dyestuffs which allow transmission of the light rays for which the layers are sensitized, and at least one of the said dyestuffs allowing transmission of the light rays for which the middle layer is sensitized, the middle layer being colored by a dyestuff which transmits the light rays for which the layer itself is sensitized, but absorbs the light rays for which the outer layers are both sensitive, which comprises, printing a different color selection image into the outer layer on each side of the film with printing light of substantially the same color, and printing another color selection image with a differently colored printing light into the middle layer.

7. A process for printing onto a light sensitive material comprising a transparent support and three diffusely colored light sensitive silver halide layers in superposition, thus forming two outer layers and a middle layer between them, one of the outer layers being colored blue-green and sensitive to blue, the middle layer being colored yellow and sensitive to green, and the other outer layer being magenta and sensitive to blue, which comprises, printing a different color selection image into the outer layer on each side of the film with printing light of substantially the same color and printing another color selection image with a differently colored printing light into the middle layer.

8. A process for printing onto a light sensitive material comprising a transparent support and three diffusely colored light-sensitive silver halide layers in superposition, thus forming two outer layers and a middle layer between them, one of the outer layers being colored magenta and sensitive to blue, the middle layer being colored yellow and sensitive to red, and the other outer layer being colored blue green and sensitive to blue, which comprises, printing a different color selection image into the outer layer on each side of the film with printing light of substantially the same color and printing another color selection image with a differently colored printing light into the middle layer.

9. A process for printing onto a light sensitive material comprising a transparent support and three diffusely colored light-sensitive silver halide layers in superposition, thus forming two outer layers and a middle layer between them, the two outer layers being predominantly sensitive to blue, the middle layer being predominantly sensitive to infra red, the outer layers being differently colored by dyestuffs which allow transmission of blue light, and at least one of the said dyestuffs allowing transmission of infra red rays, the middle layer being colored by a dyestuff which transmits infra red light, but absorbs blue light rays, which comprises, printing a part image into each of the outer layers with white light from which infra-red rays have been filtered out, and printing a third partial image into the middle layer with infra red printing light.

10. A light sensitive multi-layer photographic material comprising a transparent support and a plurality of differently colored layers in superposition, thus forming two surface layers for direct exposure and a colored middle layer between them which must be exposed through one of the colored surface layers, the surface layers being sensitive for a part only of the visible light which they transmit, the inner layer being sensitized for a part of the spectrum for which part none of the outer layers is sensitized, but for which the inner layer itself and one at least of the surface layers is transmittant, the film as a whole being insensitive to a part of the visible light.

11. A process of printing subtractive multicolor pictures which comprises printing red, blue and green color sensations onto a film comprising three emulsion layers, of which the first layer is dyed magenta and sensitized to blue, the second layer is dyed yellow and sensitized to green, and the third layer is dyed bluish green and sensitized to blue, by printing the green sensation with blue light onto the layer dyed magenta, the blue sensation with green light onto the layer dyed yellow and the red sensation with blue light onto the layer dyed bluish green.

12. A multi-layer film for subtractive multicolor photography which comprises a transparent support and three light sensitive layers colored blue-green, magenta and yellow, thus forming two surface layers for direct exposure and a colored light sensitive middle layer which must be exposed through one of the colored surface layers, the spectral ranges to which the two outer layers are predominantly sensitized including light of the same spectral region, the middle layer being predominantly sensitive for another region of the spectrum, the outer layers being differently colored by dyestuffs which allow transmission of the light rays for which the layers are sensitized, and at least one of the said dyestuffs allowing transmission of the light rays for which the middle layer is sensitized, the middle layer being colored by a dyestuff, which transmits the light rays for which the layer itself is sensitized, but absorbs the light rays of the spectral region for which both outer layers are sensitized, the film as a whole being insensitive to a part of the visible light.

13. A multi-layer film for subtractive multicolor photography which comprises a transparent support and three light sensitive layers colored blue-green, magenta and yellow, thus forming two surface layers for direct exposure and a colored light sensitive middle layer which must be exposed through one of the colored surface layers, the spectral ranges to which the two outer layers are predominantly sensitized including light of the same spectral region, the middle layer being predominantly sensitive for another region of the spectrum, the outer layers being differently colored by dyestuffs which allow transmission of the light rays for which the layers are sensitized, and at least one of the said dyestuffs allowing transmission of the light rays for which the middle layer is sensitized, the middle layer being colored by a dyestuff which transmits the light rays for which the layer itself is sensitized, but absorbs the light rays of the spectral region for which both outer layers are sensitized.

14. A light sensitive multi-layer photographic material comprising a transparent support and a plurality of differently colored layers thus forming two surface layers for direct exposure and a middle layer between them which must be exposed through one of the colored surface layers and which is colored by a dyestuff which is not removable by ordinary photographic treating baths but which is selectively removable under the influence of the silver image, at least one of the surface layers being sensitive for a part only of the visible light which the layer transmits, the middle layer being additionally dyed with a soluble filter dyestuff which absorbs light rays for which the first referred to dyestuff coloring said middle layer and also the dyestuff coloring a superposed layer are transmittant and for which at least said superposed layer is sensitive, the middle layer being predominantly sensitized for a part of the spectrum for which part none of the outer layers is sensitized, but for which the middle layer itself and one at least of the surface layers is transmittant, the film as a whole being insensitive to a part of the visible light.

15. A light sensitive multi-layer photographic material comprising a transparent support and a plurality of differently colored layers thus forming two surface layers for direct exposure and a middle layer between them which must be exposed through one of the colored surface layers and which is colored by a dyestuff which is not removable by ordinary photographic treating baths but which is selectively removable under the influence of the silver image, at least one of the surface layers being sensitive for a part only of the visible light which the layer transmits, the middle layer being additionally dyed with a soluble filter dyestuff which absorbs light rays for which the first referred to dyestuff coloring said middle layer and also the dyestuff coloring a superposed layer are transmittant and for which at least said superposed layer is sensitive, the middle layer being predominantly sensitized for a part of the spectrum for which part none of the outer layers is sensitized, but for which the middle layer itself and one at least of the surface layers is transmittant.

16. A light sensitive multi-layer photographic material comprising a transparent support and a plurality of layers differently colored by dyestuffs which are not removable by ordinary photographic treating baths but which are selectively removable under the influence of the silver image and which form two surface layers for direct exposure and a colored middle layer between them which must be exposed through one of the colored surface layers, the middle layer being sensitized for light rays which are transmitted by the middle layer and at least one surface layer and for which the surface layers are insensitive, each of the surface layers being sensitized for light rays which are transmitted by the respective layer and for which the middle layer is insensitive, at least one outer layer being additionally dyed with a soluble filter dye which transmits light rays for which the layer is sensitized.

17. A multi-layer film for subtractive multicolor photography which comprises a transparent support and three light sensitive layers colored blue-green, magenta and yellow, thus forming two surface layers for direct exposure and a colored light sensitive middle layer which must be exposed through one of the colored surface layers, the two outer layers being of the same predominant sensitivity, the middle layer being predominantly sensitive for another part of the spectrum, the outer layers being differently colored by dyestuffs which allow transmission of the light rays for which the layers are sensitized and at least one of the said dyestuffs allowing transmission of the light rays for which the middle layer is sensitized, the middle layer being colored by a dyestuff which transmits the light rays for which the layer itself is sensitized, but absorbs the light rays for which the outer layers are sensitized.

18. A process for printing onto a light sensitive material having a transparent support and three diffusely colored light sensitive silver halide layers in superposition thus forming two outer layers and a middle layer between them the two outer layers being sensitive to a common spectral range, the middle layer being sensitive for another part of the spectrum, the outer layers being differently colored by dyestuffs which allow transmission of the light rays for which the layers are sensitized and at least one of the said dyestuffs allowing transmission of the light rays for which the middle layer is sensitized, the middle layer being colored by a dyestuff which transmits the light rays for which the layer itself is sensitized but absorbs the light rays for which the outer layers are both sensitive, which comprises exposing the one side of the multi-layer material behind a multicolor master image having two different color selection pictures recorded in the form of dyestuff images absorbent respectively for light rays to which the surface layer is sensitized and for light rays to which the middle layer is sensitized but for which said surface layer is transparent, the printing light used for exposure including said light rays, exposing the opposite side of the multi-layer material behind a master image in which a third color selection picture is recorded, the printing light used for printing this master image onto the multi-layer material including light rays for which the last named surface layer is sensitized.

19. A process for printing color selection pictures onto a multi-layer printing material having a transparent support and three light sensitive silver halide layers colored blue-green, magenta and yellow, thus forming two surface layers for direct exposure and a colored light sensitive middle layer which must be exposed through one of the colored surface layers, one surface layer being predominantly sensitized for part only of the light which the layer transmits, the middle layer being predominantly sensitized for light rays which are transmitted by both the middle layer and the last mentioned surface layer and for which said surface layer is substantially insensitive, the other outer surface layer being sensitized for light which the layer transmits, including light for which the opposite surface layer is sensitized and which is absorbed by the colored middle layer, which comprises, exposing one side of the multi-layer material behind a master image representing a color selection picture, the printing light used including light rays for which the surface layer is sensitized but excluding light rays for which the middle layer is sensitized and for which said surface layer is transparent, exposing the opposite side of the multi-layer material behind a master image representing a different color selection picture, the printing light including light rays for which the other surface layer is sensitive but excluding light rays for which the middle layer is sensitized and for which said surface layer is transparent, and exposing the middle layer behind a master image representing a third color selection picture, the printing light including light rays to which the middle layer is sensitized, the exposure of the middle layer being performed through the surface layer which is transparent for such light rays and the printing light for the middle layer excluding light rays for which said surface layer is sensitized.

20. A process for printing color selection pictures onto a multi-layer printing material having a transparent support and three light sensitive silver halide layers colored blue-green, magenta and yellow, thus forming two surface layers for direct exposure and a colored light sensitive middle layer which must be exposed through one of the colored surface layers, one surface layer being predominantly sensitized for part only of the light which the layer transmits, the middle layer being predominantly sensitized for light rays which are transmitted by both the middle layer and the last mentioned surface layer and for which said surface layer is substantially insensitive, the other outer surface layer being sensitized for light which the layer transmits, including light for which the opposite surface layer is sensitized and which is absorbed by the colored middle layer, which comprises, exposing the one side of the multi-layer material behind a master image representing a color selection picture, the printing light used including light rays for which the surface layer is sensitized but excluding light rays for which the middle layer is sensitized and for which said surface layer is transparent, exposing the opposite side of the multi-layer material behind a master image representing a different color selection picture, the printing light including light rays for which the other surface layer is sensitive but excluding light rays for which the middle layer is sensitized and for which said surface layer is transparent, and exposing the middle layer behind a master image representing a third color selection picture, the printing light including light rays to which the middle layer is sensitized, the exposure of the middle layer being performed through the surface layer which is transparent for such light rays and the printing light for the middle layer excluding light rays for which said surface layer is sensitized, at least one of said master images being a dyestuff image absorbent for light rays with which it is printed.

21. A process for printing color selection pictures onto a multi-layer printing material having a transparent support and three light sensitive silver halide layers colored blue-green, magenta and yellow in superposition, thus forming two surface layers for direct exposure and a colored light sensitive middle layer which must be exposed through one of the colored surface layers, one surface layer being predominantly sensitized for part only of the light which the layer transmits, the middle layer being predominantly sensitized for light rays which are transmitted by both the middle layer and the last mentioned surface layer and for which said surface layer is substantially insensitive, the other surface layer being sensitized for light which the layer transmits, including light for which the opposite surface layer is sensitized and which is absorbed by the colored middle layer, which comprises, exposing the one side of the multi-layer material behind a master image having two different color selection pictures recorded in the form of dyestuff images absorbent respectively for light rays to which the surface layer is sensitized and for light rays to which the middle layer is sensitized but for which said surface layer is transparent, the printing light used for exposure including said light rays, exposing the opposite side of the multi-layer material behind a master image in which a third color selection picture is recorded, the printing light used for printing the last mentioned master image into the multi-layer material including light for which the surface layer on that side is sensitized but excluding light rays for which the middle layer is sensitized and for which said surface layer is transparent.

22. A process of producing subtractive three-color pictures on a multi-layer film comprising a transparent support and three light sensitive silver halide layers colored blue-green, yellow, and magenta in superposition, the middle layer being sensitized to light for which the layer itself and one outer layer is transmittant and for which both outer layers are insensitive, each of the outer layers being sensitive to light transmitted by the dyestuff used for coloring the layer, which comprises, printing two color selection pictures from one side into the middle layer and into that outer layer respectively of said multi-layer material which is transmittant for light for which the middle layer is sensitive and printing a third color selection picture into the third layer of said multi-layer material from the other side, the printing lights used in printing all of said color selection pictures from both sides including only a part of the visible light.

23. A light sensitive material for producing multi-color images comprising a transparent support and three light sensitive silver halide layers, the two outer layers being of the same predominant sensitivity, the middle layer being predominantly sensitive for another part of the spectrum, each of the outer layers allowing transmission of the light rays for which the layer is sensitized, and at least one of the outer layers being insensitive to and allowing transmission of light rays for which the middle layer is sensitized, the middle layer being colored by a dyestuff which is not removable by ordinary photographic treating baths but which is selectively removable under the influence of the silver image and which transmits light rays for which the layer itself is sensitized but absorbs the light rays for which both the outer layers are sensitized.

24. A multi-layer film for subtractive multi-color photography which comprises a transparent support and three light-sensitive layers colored blue-green, magenta and yellow, thus forming two surface layers for direct exposure and a colored light-sensitive middle layer which must be exposed through one of the colored surface layers, the two outer layers being insensitive to infra-red light and differently colored by dyes which allow transmission of the light rays for which the layers are sensitized, at least one of said dyes allowing transmission of infra-red light, the middle layer being sensitized to infra-red light and colored by a dye which transmits infra-red light and absorbs light rays to which at least one surface layer is sensitive.

25. A light-sensitive multi-layer photographic material comprising a transparent support and three light-sensitive silver halide emulsion layers dyed by a yellow, a magenta and a blue-green dye respectively, thus forming two surface layers for direct exposure and a colored middle layer between them which must be exposed through one of the colored surface layers and which is absorbent for light to which at least one outer layer is sensitive, the yellow layer being sensitive to red light, the magenta layer being sensitive to blue light and the blue-green layer being substantially insensitive to blue light and sensitive to light transmited by the blue-green dye.

26. A light-sensitive multi-layer photographic material comprising a transparent support and three light-sensitive silver halide emulsion layers dyed by a yellow, a magenta and a blue-green dye respectively, thus forming two surface layers for direct exposure and a colored middle layer between them which must be exposed through one of the colored surface layers and which is absorbent for light to which at least one outer layer is sensitive, the yellow layer being sensitive to green light, the blue-green layer being sensitive to blue light and the magenta layer being sensitive to light transmited by the magenta color but substantially insensitive to blue light.

BÉLA GASPAR.